Dec. 13, 1966 HANS-JOACHIM HENKEL 3,292,055

TUNNEL DIODE WITH PARALLEL CAPACITANCE

Filed July 20, 1961

United States Patent Office 3,292,055
Patented Dec. 13, 1966

3,292,055

TUNNEL DIODE WITH PARALLEL CAPACITANCE

Hans-Joachim Henkel, Erlangen, Germany, assignor to Siemens-Schuckertwerke Aktiengesellschaft, Berlin-Siemensstadt, Germany, a corporation of Germany Filed July 20, 1961, Ser. No. 125,548
Claims priority, application Germany, July 30, 1960, S 69,707
3 Claims. (Cl. 317—234)

My invention relates to semiconductor diodes in which the quantum-mechanical tunnel effect in a narrow p-n junction is utilized. The essential characteristic of such tunnel diodes, described by L. Esaki in Physical Review, vol. 109, 1958, page 603 is a descending current-voltage characteristic within a given range for a positive poling of the p-region. Such tunnel diodes and methods for their manufacture are also described in the copending application of H. Welker et al., Serial No. 90,098, filed February 17, 1961, now abandoned, assigned to the assignee of the present invention.

As a rule, circuit components with a negative resistance characteristic are advantageous for many regulating purposes. Tunnel diodes, however, reduce the damping of any parallel connected oscillatory circuits and thus tend to produce oscillations. This renders them unsuitable for many regulating purposes.

It is an object of my invention, therefore, to devise a tunnel diode which inherently suppresses the occurrence of self-oscillations.

To this end, and in accordance with my invention, the capacitance of the tunnel diode is increased by providing the diode semiconductor body with a non-tunnelling p-n junction which constitutes a capacitance in parallel to the tunnelling junction proper.

The invention will be further described with reference to the accompanying drawing in which.

Figure 1:
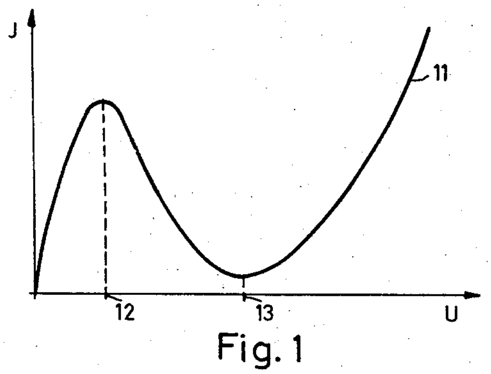
FIG. 1 is a current-voltage characteristic typical for tunnel diodes.
Figure 3:
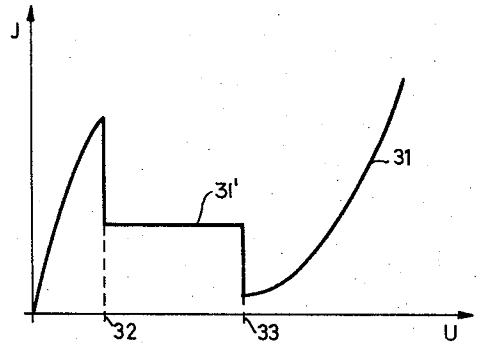
FIG. 3 is a graph showing a current-voltage characteristic of an oscillating tunnel diode.
Figure 6:
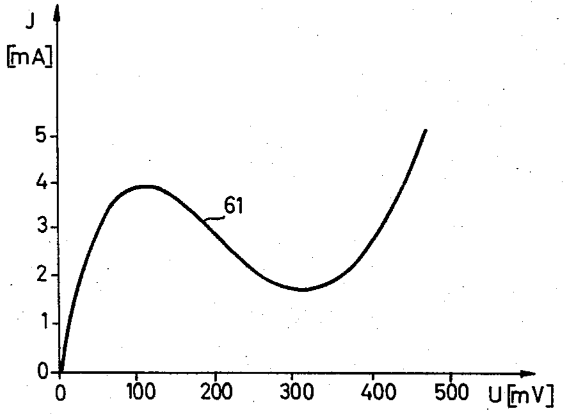
FIG. 6 is a diagram showing a typical current-voltage characteristic of a non-oscillating tunnel diode according to FIG. 4.

In the graphs shown in FIGS. 1, 3 and 6, the abscissa denotes voltage U and the ordinate denotes current J. The characteristic shown in FIG. 1 exhibits a current maximum at low voltage point 12 with positive poling of the p-region, and a current minimum at 13, typical for tunnel diodes. Located between these two extremes is a portion of negative resistance. That is, between the voltage limits 12 and 13 an increase in voltage causes the resistance of the tunnel diode to increase and hence the current J to decrease between the maximum at 12 and the minimum at 13.

Figure 2:
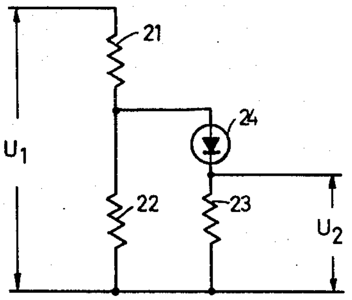
FIG. 2 shows schematically a circuit diagram of a regulator unit containing a tunnel diode.

In the circuit diagram of a regulating unit shown in FIG. 2, the voltage to be regulated is denoted by $U_1$. It is reduced to a suitable output voltage by means of a voltage divider consisting of two resistors 21 and 22 which are series connected between the two supply leads for the input voltage $U_1$. The voltage at the resistor 22 may amount to about 100 millivolts for a germanium tunnel diode and to about 300 millivolts for a gallium arsenide (GaAs) tunnel diode, for example. The tunnel diode 24 and a series-connected resistor 23 lie in parallel to the voltage-divider resistor 22. The voltage drop of the resistor 23 constitutes the output voltage $U_2$ of the regulating unit. Due to the negative characteristic of the tunnel diode 24, this voltage drop increases with a decrease in input voltage $U_1$, or decreases with an increase in voltage $U_1$. The output voltage $U_2$ of the unit therefore can be employed for regulating the voltage $U_1$.

It is to be noted that in a regulating circuit according to FIG. 2, the sum of the resistances of resistors 22 and 23 is smaller than the amount of the negative resistance of the tunnel diode. This is necessary in order to place the working point in the range of the negative characteristic of the tunnel diode.

For regulating purposes of the kind exemplified by the above-described circuit diagram of FIG. 2, tunnel diodes have the undesirable property of reducing or eliminating the damping of any parallel-connected oscillatory components and for that reason have the tendency to produce oscillations in the circuitry of which the tunnel diode forms part. In a regulating circuit according to FIG. 2, such an oscillatory circuit is constituted already by the inevitable inductivities of the circuit leads between the resistors 22, 23 and the tunnel diode 24, also by the self-inductances of the resistors as well as by the likewise inevitable self-capacitance of the tunnel diode. In general, even with a design as inductance-free as feasible, an effective inductivity below an approximate value of 10 nh. cannot be attained in practice. This corresponds approximately to the self-inductance of a wire of 1 cm. length and 0.1 mm. diameter.

FIG. 3 shows the characteristic 31 of an oscillating tunnel diode. Such an oscillating tunnel diode is unsuitable for regulating purposes because it superimposes upon the current to be regulated an oscillation current in such a manner that, within the utilizable range between the current extremes at 32 and 33 the operating current no longer decreases continuously, but remains constant, this being apparent from the portion 31' of the characteristic shown in FIG. 3.

For excitation of oscillations by a tunnel diode, it is necessary that the resonance resistance of the oscillatory circuit be greater than the amount of negative resistance $R_N$ of the tunnel diode. There exists the following relation:

$$|R_N| \leq \frac{L}{R.C} \tag{1}$$

wherein:

$|R_N|$=the amount of negative resistance of the tunnel diode.
$L$=inductivity of the supply leads.
$R$=sum of the loss resistances.
$C$=capacitance of the tunnel diode.

For stable operation of a tunnel diode, the following condition must be satisfied:

$$L < |R_N| \cdot R \cdot C \tag{2}$$

It can be derived therefrom, that the inductivity L must be smaller than the product $|R_N| \cdot R \cdot C$. It should be noted that R must not be greater than $R_N$.

For stable operation of a regulating circuit by means of tunnel diodes, the following possibilities can be derived from the above-given relation (2):

(1) Increasing the negative resistance $R_N$ of the tunnel diode.

(2) Increasing of the capacitance C of the tunnel diode.

The first possibility, of increasing negative resistance $R_N$ of the tunnel diode, is unfavorable because it reduces the available output of control power. A realization of the second possibility appears more favorable, but is not readily possible. A connection of additional capacitors to the tunnel diode would not have the desired result because the self-inductance of capacitors is likewise in the order of magnitude of at least 10 nh. An increase in self-capacitance C of the tunnel diode is possible only to a very limited extent.

According to the invention, however, the capacitance of the tunnel diode can be effectively increased by a parallel capacitance constituted by the capacitance of a p-n junction. In order to avoid connecting wires, this p-n junction is comprised within the semiconductor body of the tunnel diode itself. Suitable for the production of such tunnel diodes according to the invention are silicon, germanium, as well as $A^{III}B^{V}$ semiconductors such as indium arsenide, indium antimonide, indium phosphide, gallium antimonide and gallium arsenide.

The tunnel diode according to the invention, illustrated in FIG. 4, can be made as follows. A circular semiconductor plate 41, for example of monocrystalline n-type GaAs, is placed into a processing vessel, for example a quartz ampule, which is then fused off so as to be sealed from the environment. In the ampule, the semiconductor disc is subjected to a zinc atmosphere at a temperature of 900° C. for approximately one hour. As a result, zinc, a p-doping (acceptor) substance relative to gallium arsenide, diffuses into the n-type GaAs and produces a non-tunnelling p-n junction schematically indicated at 42. This junction has a relatively high capacitance. Tunnelling of electrons through the p-n junction is not possible because with diffused p-n junctions the width of the space-charge zone is too great. Thereafter, the semiconductor body 41 thus prepared, is removed from the processing vessel. A ball 44 of doping material, for example tin, is alloyed into the GaAs disc by heating the disc with the ball to a temperature of 600° C. for one minute. Tin is an n-doping (donor) substance. This alloying operation produces in the diffusion layer 43 a tunnelling p-n junction 45 of relatively low capacitance. The ball 44 is alloyed down to such a depth that it forms a barrier-free (ohmic) contact with the n-type portion 41. Thereafter, the diffusion layer is provided with a barrier-free metal contact 46.

Figure 5:
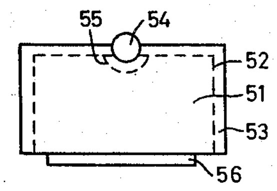
FIGS. 4 and 5 illustrate different embodiments, respectively, of tunnel diodes according to the invention.

The embodiment shown in FIG. 5 comprises a semiconductor body 51 in form of a circular disc consisting of n-type GaAs which is treated in accordance wtih the above-described diffusion method. In this manner, a non-tunnelling p-n junction 52 of relatively high capacitance is formed. Thereafter, a ball 54 consisting of 95% tin and 5% zinc by weight is alloyed into the semiconductor body 51 by heating the body with the ball at a temperature of 600° C. for one minute. Zinc is an acceptor substance. This alloying operation produces in the n-type starting material 51 a tunnelling p-n junction 55 of relatively low capacitance. The ball 54 is alloyed so deeply into the body that it forms a barrier-free contact with the diffusion layer 53. Ultimately, the n-type layer 51 is provided with a barrier-free metal contact 56.

Figure 4:
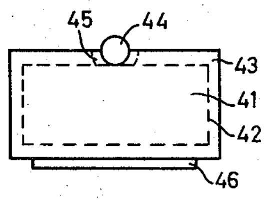

FIG. 6 indicates quantitative data for a tunnel diode according to FIG. 4, the voltage being given in millivolts and the current in milliamps. A current maximum occurs at approximately 100 millivolts and a current minimum at approximately 300 millivolts.

I claim:

1. A tunnel diode comprising a semiconductor body having two electrodes bonded thereto and having between said electrodes two p-n junctions of which only one is an alloyed tunnel-effect junction of considerably smaller area than the other so that it is of low capacitance relative to said other and the other is a diffused junction of considerably larger area than the one so that it is of high capacitance relative to said one, said diffused junction being electrically in parallel to said tunnel-effect junction.

2. A tunnel diode as claimed in claim 1, wherein said tunnel diode has oscillating tendencies and the capacitance of said other junction is sufficient to minimize oscillating tendencies of said tunnel diode.

3. A tunnel diode comprising a semiconductor body of monocrystalline substance selected from the group consisting of silicon, germanium, indium arsenide, indium antimonide, indium phosphide, gallium antimonide and gallium arsenide, two electrodes joined with said body on opposite sides thereof, one of said electrodes being smaller than the other, said body having between said electrodes two p-n junctions, only one of said junctions being an alloyed tunnel-effect junction and being smaller in area than the other so that it has a lower capacitance than said other, said tunnel-effect junction being close to said smaller electrode and remote from said other electrode, and said other junction being a diffuse junction and having a considerably larger area than the tunnel-effect junction so that it has a higher capacitance than said tunnel-effect junction, said other junction being electrically in parallel with said tunnel-effect junction.

References Cited by the Examiner

UNITED STATES PATENTS

| | | | |
|---|---|---|---|
| 2,937,114 | 5/1960 | Shockley ___________ | 317—235 |
| 3,079,512 | 2/1963 | Rutz _______________ | 317—234 |
| 3,114,864 | 12/1963 | Chih-Tang Sah ______ | 317—234 |

JOHN W. HUCKERT, *Primary Examiner.*

L. ZALMAN, J. D. KALLAM, R. SANDLER, *Assistant Examiners.*